(12) United States Patent
Baitz et al.

(10) Patent No.: US 7,057,117 B2
(45) Date of Patent: Jun. 6, 2006

(54) COMBINATION BALANCE AND CASH REGISTER

(75) Inventors: Guenter Baitz, Berlin (DE); Wolfgang Lohnstein, Berlin (DE)

(73) Assignee: Wincor Nixdorf International GmbH, Paderborn (DE)

( * ) Notice: Subject to any disclaimer, the term of this patent is extended or adjusted under 35 U.S.C. 154(b) by 0 days.

(21) Appl. No.: 10/513,801

(22) PCT Filed: Jun. 20, 2003

(86) PCT No.: PCT/DE03/02055

§ 371 (c)(1),
(2), (4) Date: Nov. 8, 2004

(87) PCT Pub. No.: WO2004/017032

PCT Pub. Date: Feb. 26, 2004

(65) Prior Publication Data

US 2005/0173160 A1    Aug. 11, 2005

(30) Foreign Application Priority Data

Jul. 31, 2002  (DE)  .......................... 202 11 763 U
Feb. 13, 2003  (DE)  .......................... 203 02 399 U

(51) Int. Cl.
*G01G 19/414*  (2006.01)
(52) U.S. Cl. .................... 177/25.15; 705/414; 705/416
(58) Field of Classification Search ........ 705/414–416;
177/25.15
See application file for complete search history.

(56) References Cited

U.S. PATENT DOCUMENTS

| 3,177,957 | A | * | 4/1965 | Adler et al. .................... 177/3 |
| 3,770,069 | A | * | 11/1973 | Loshbough .................... 177/1 |
| 3,826,319 | A | * | 7/1974 | Loshbough .............. 177/25.15 |
| 3,869,005 | A | * | 3/1975 | Williams et al. ......... 177/25.15 |
| 3,937,287 | A | * | 2/1976 | Pryor et al. .............. 177/25.15 |
| 4,159,521 | A | * | 6/1979 | Hall et al. .................. 705/415 |
| 4,180,856 | A | * | 12/1979 | Check et al. ............... 705/407 |

(Continued)

FOREIGN PATENT DOCUMENTS

DE    30 03 255 A1    1/1980

(Continued)

OTHER PUBLICATIONS

Kreuzer, M.; "Multichannel system for high precision static and fast dynamic measurements", Measurement vol. 10 No. 1, Jan.-Mar. 1992, pp. 8-13, Hottinger Baldwin Massiechnik GmbH, Darmstadt, Germany.

*Primary Examiner*—Randy W. Gibson
(74) *Attorney, Agent, or Firm*—Michaud-Duffy Group LLP

(57) ABSTRACT

The invention relates to the combination of a balance and a cash register with a customer display device shared by both, customary cash register software being used for this purpose. A multiplexer is used, the one data input of which has weighing data of the balance applied to it and the other input of which has price and/or product data that are output by the data processing unit applied to it, the one data input being activated by a multiplex switching signal when the weighing data have a value other than zero.

14 Claims, 3 Drawing Sheets

U.S. PATENT DOCUMENTS

| | | | |
|---|---|---|---|
| 4,266,623 A * | 5/1981 | Kawanishi et al. ...... 177/25.15 |
| 4,313,509 A * | 2/1982 | Engels ........................ 177/50 |
| 4,339,011 A * | 7/1982 | DiMarzio .................... 177/177 |
| 4,379,495 A * | 4/1983 | Cocks et al. .................... 177/1 |
| 5,058,946 A * | 10/1991 | Faber ...................... 296/186.4 |
| 5,139,100 A * | 8/1992 | Brauneis ................. 177/25.15 |
| 5,174,399 A | 12/1992 | Brauneis ................. 177/25.15 |
| 5,731,799 A | 3/1998 | Kee et al. .................... 345/634 |
| 2003/0168260 A1* | 9/2003 | Muyal |

FOREIGN PATENT DOCUMENTS

| | | |
|---|---|---|
| DE | 44 08 549 A1 | 3/1994 |
| DE | 299 14 668 U1 | 8/1999 |
| DE | 100 37 314 A1 | 7/2000 |
| DE | 202 11 763 U1 | 7/2002 |
| EP | 1 061 486 A2 | 12/2000 |
| WO | WO 95/14367 | 5/1995 |
| WO | WO 01/90706 A2 | 11/2001 |

* cited by examiner

COMBINATION BALANCE AND CASH REGISTER

CROSS-REFERENCE TO RELATED APPLICATIONS

This application is entitled to the benefit of and incorporates by reference essential subject matter disclosed in International Application No. PCT/DE2003/002055 filed on Jun. 20, 2003, German Patent Application No. 20211763.4 filed on Jul. 31, 2002, and German Patent Application No. 20302399.4 filed on Feb. 13, 2003.

FIELD OF THE INVENTION

The invention relates to combination of a balance and a cash register with a customer display device shared by both.

BACKGROUND OF THE INVENTION

Balances in the retail sector have a display on which the weight of a weighed article can be viewed. According to regulations in most countries, weight measuring devices must be calibrated and approved by the standardizing authorities if they are used for billing purposes.

Such balances are often used together with a cash register, the cash register registering the prices of the weighed articles together with other articles that do not have to be weighed. Both devices have displays facing the customer, so-called customer displays, to display the amount, the unit price and the respective price. If the customer is also to be given a receipt relating to the amount of the article, two receipt printers are required, one on the balance and one on the cash register. Such a combination of a balance and cash register is represented in DE 30 03 255 A1.

A single device with only one display and one receipt printer is desirable, the display and the receipt including both the weight values and the prices of the weighed articles and being able to be used to display and print out the number of items, description and price of other, non-weighed articles. A joint display is permissible if the data displayed cannot be confused with weight values or prices derived from them. Regulations on this can be found in DIN EN 45 501, which corresponds to the recommendations R 76-1 of the "Organisation Internationale de Metrologie Legale", O1ML.

A combination of a cash register and a balance with a customer display shared by both devices has been proposed in DE 44 08 549 A1, the electronics of the balance only allowing display data that are compatible with the weighing undertaken at the particular time. The evaluation unit does not itself provide any outputs on the display unit. Rather, after reception of the weighing data from the measuring pickup, the weighing result is initially transmitted from the evaluation unit into the cash register. There, a price is determined by means of a price table and a display is compiled and sent to the evaluation unit. The evaluation unit checks the desired display texts to ascertain that they are not inadmissible and displays them.

The aforementioned combination of the cash register with a balance has the disadvantage that the evaluation unit is connected directly to the PC bus, which presupposes both special operating system software and special user software. Furthermore, customers are not accustomed to reading information concerning prices and quantities from the customer display of a balance.

WO 95/14367 A1 discloses a control device referred to as an 'electronic box', which is constructed on the PC principle. It contains a motherboard, the rear edge of which is provided, inter alia, with a plug for a keyboard and with connection sockets for serial and parallel peripheral interfaces. Arranged parallel to the motherboard are additional printed circuit boards, which are constructed on the basis of the PC-AT standard and, on an edge parallel to the rear edge of the motherboard, bear connection plugs for further peripheral connections. The additional printed circuit boards are connected to the motherboard by being plugged on means of a bus expansion card.

The general object of the invention is to provide a combination cash register and balance having only one customer display which manages with previously customary cash register software.

SUMMARY OF THE INVENTION

The invention provides for the use of a multiplexer, the one data input of which has weighing data of the balance applied to it and the other input of which has price and/or product data that are output by the data processing unit applied to it, the one input being activated by a multiplex switching signal when the weighing phase begins. The switching is consequently performed by the balance itself, without the weighing data to be displayed having to be prepared for display in the data processing unit or any validity assessments having to be performed by it. Rather, the evaluation unit generates the multiplex switching signal itself.

According to a preferred embodiment of the invention, the evaluation unit can be supplied with a zeroing signal and a tare signal, which respectively have the effect that the weighing data assume the value zero and which are generated by command buttons arranged on the cash register. On the one hand, this ensures proper weighing, on the other hand this allows switching to the display of price and article data when there is not in any case any article to be weighed on the balance.

The evaluation unit is provided with a calibrating switch, which is arranged in a sealable housing, so that the balance conforms to the statutory calibrating regulations.

BRIEF DESCRIPTION OF THE DRAWINGS

Further details and advantages of the invention can be taken from the description in conjunction with the accompanying drawing, in which:

In FIG. 1, an electronic box 10 constructed on the basis of the PC principle is represented by broken lines. Arranged in it on a motherboard 12 is a data processing unit 14, often referred to as a CPU. Controlled by the data processing unit 14 is a data/address bus 16, which is configured as a PCI bus and to which there can be connected by means of a bus expansion card 18, as described in WO 95/14367 A1, a number of peripheral control cards, of which only a video module card 20 is represented, since it is the only one that is pertinent to the invention.

Figure 1:
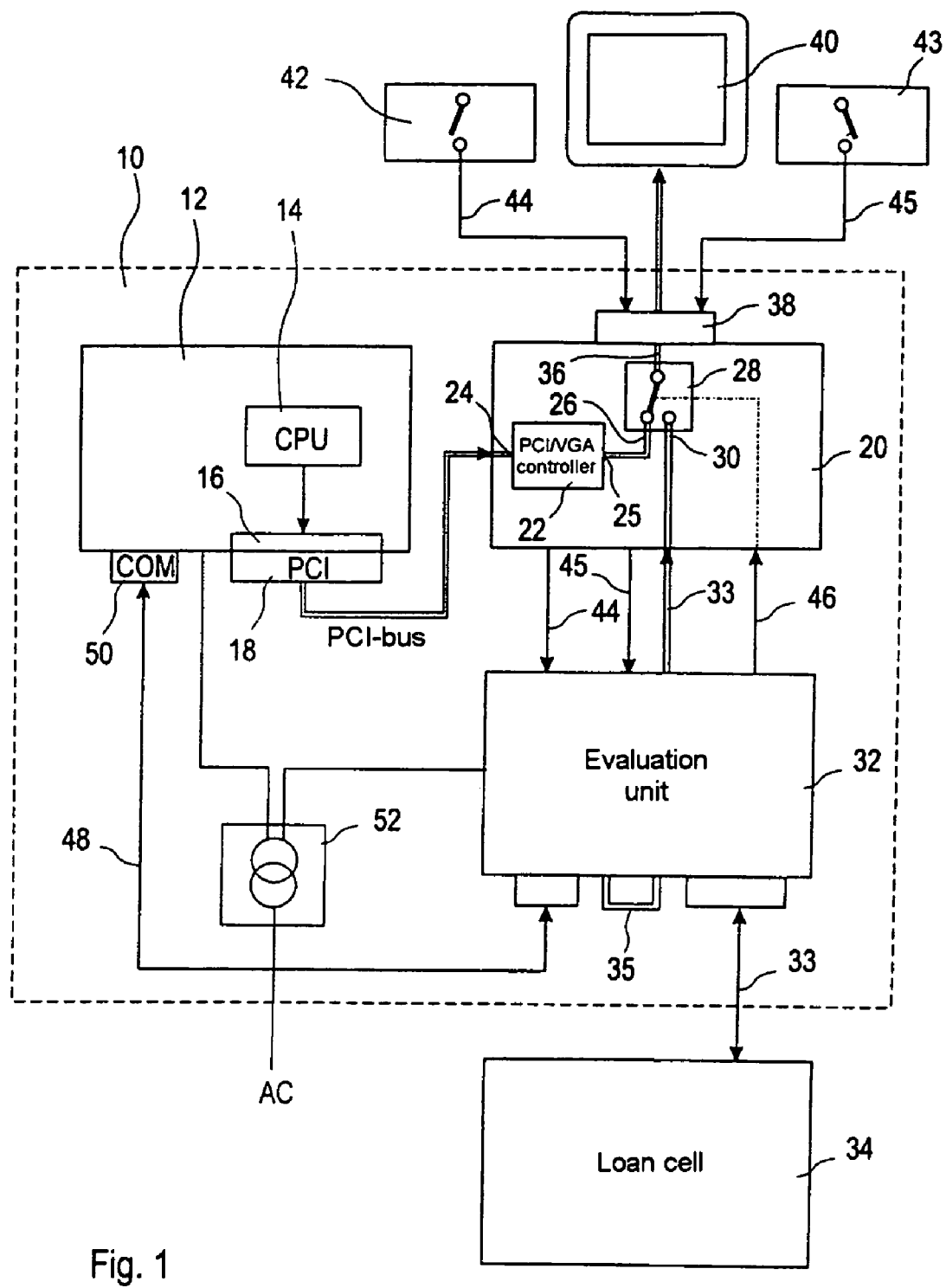
FIG. 1 shows a block diagram of a first combination of a cash register with a balance.

The video module card 20 contains a VDU control unit 22, which is generally referred to as a VGA controller, the input 24 of which is connected via the bus expansion card 18 to the data/address bus 16. The VDU control unit 22 converts the price and product data to be displayed, carried on the data/address bus 16, into video signals for a customer display 40, described further below. The output 25 of the VDU control unit 22 is led to a first input 26 of a video multiplexer 28. A second input 30 of the video multiplexer 28 has video signals applied to it, provided by an evaluation unit 32 for weighing data supplied via a weighing data line 23 from a weighing cell 34. The evaluation unit 32 and the encapsulated and sealed calibrating switch 35 and the weighing cell 34 together form a calibratable balance.

The output 36 of the video multiplexer 28 leads to a screen plug 38, to which the customer display 40 formed as a VGA/4-LCD visual display unit is connected.

DETAILED DESCRIPTION OF THE PREFERRED EMBODIMENTS

Also represented along with the customer display 40 are a zeroing button 42 and a tare button 43, the signals 44 and 45 of which are supplied to the evaluation unit 32 via free contacts of the screen plug 38 and the video module card 20. The zeroing signal 44 sets the weighing data value to zero, irrespective of the actual output signal of the weighing cell 34. This allows inaccuracies in the setting up of the balance to be corrected. The tare signal 45 sets the weighing data value to zero and compensates for example for the weight of an article container.

The evaluation unit 32 generates a multiplex switching signal 46, which always activates the video multiplexer 28 for the weighing data when the weighing phase begins. This ensures that the weight of an article has priority in being displayed on the customer display 40. The article weight is also supplied to a serial interface 50 of the data processing unit 14 via a serial data connection 48. The evaluation unit 32 is supplied with electrical power from a power supply unit 52 of the electronic box 10.

Figure 2:
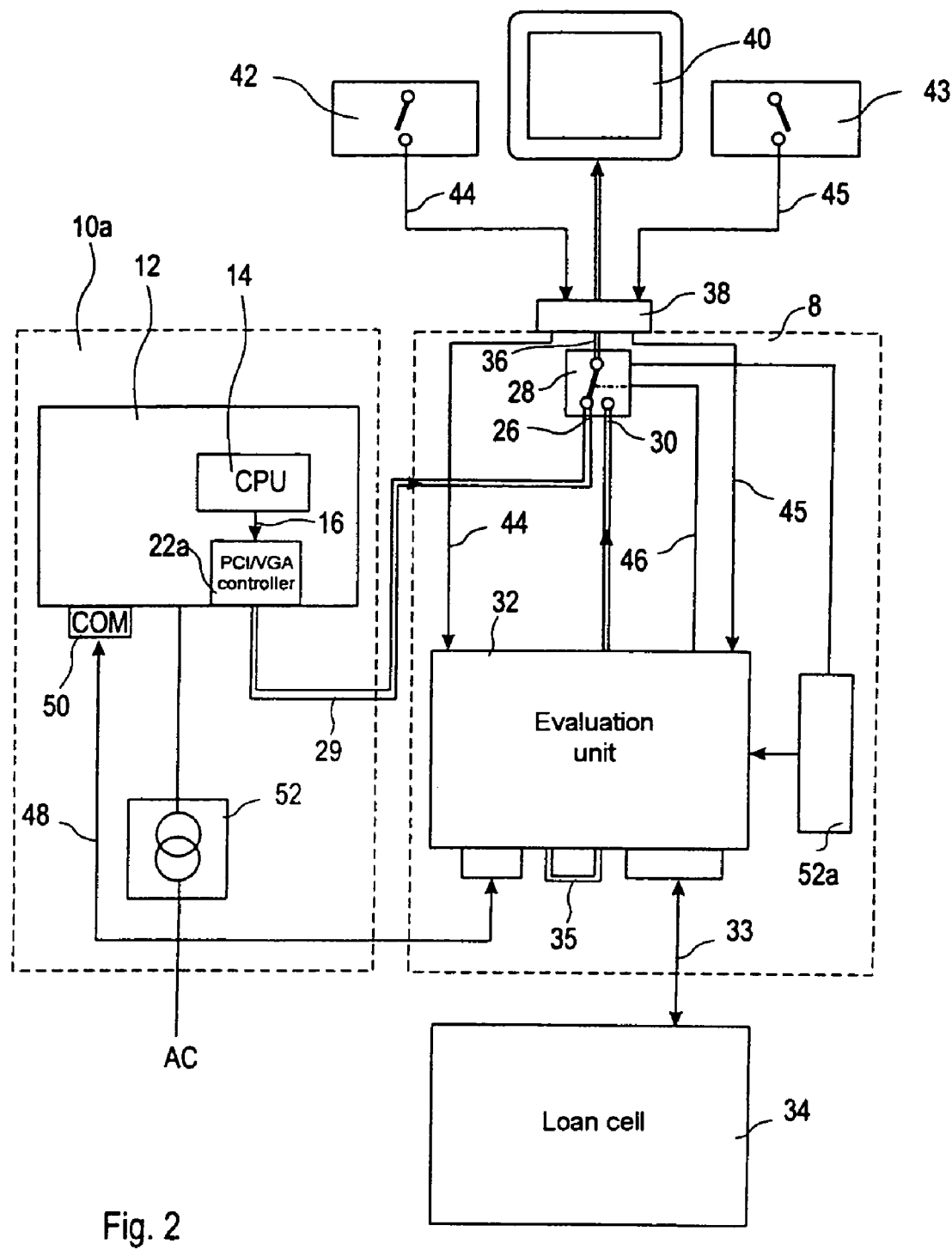
FIG. 2 shows a block diagram of a second combination of a cash register with a balance.

In a second exemplary embodiment, individual functional modules may also be arranged spatially separate from one another in two different housings, as is represented as a block diagram in FIG. 2. Functionally identical elements are identified by the same reference numerals therein and in a third exemplary embodiment described further below in conjunction with FIG. 3. In FIG. 2, the video multiplexer 28, the evaluation unit 32 and a second power supply unit 52a, feeding both modules, are arranged in a housing 8 represented by broken lines. A second VDU control unit 22a, on the other hand, is arranged as a module either as an integral part of the motherboard 12 or as a PCI plug-in module on the motherboard 12 in the electronic box 10a. A video connection 29 leads from the second VDU control unit 22a to the video multiplexer 28 and a further data connection 48 leads from the serial interface 50 of the motherboard 12 to the evaluation unit 32. The electronic box 10a is supplied with power as described above by a power supply unit 52.

Figure 3:
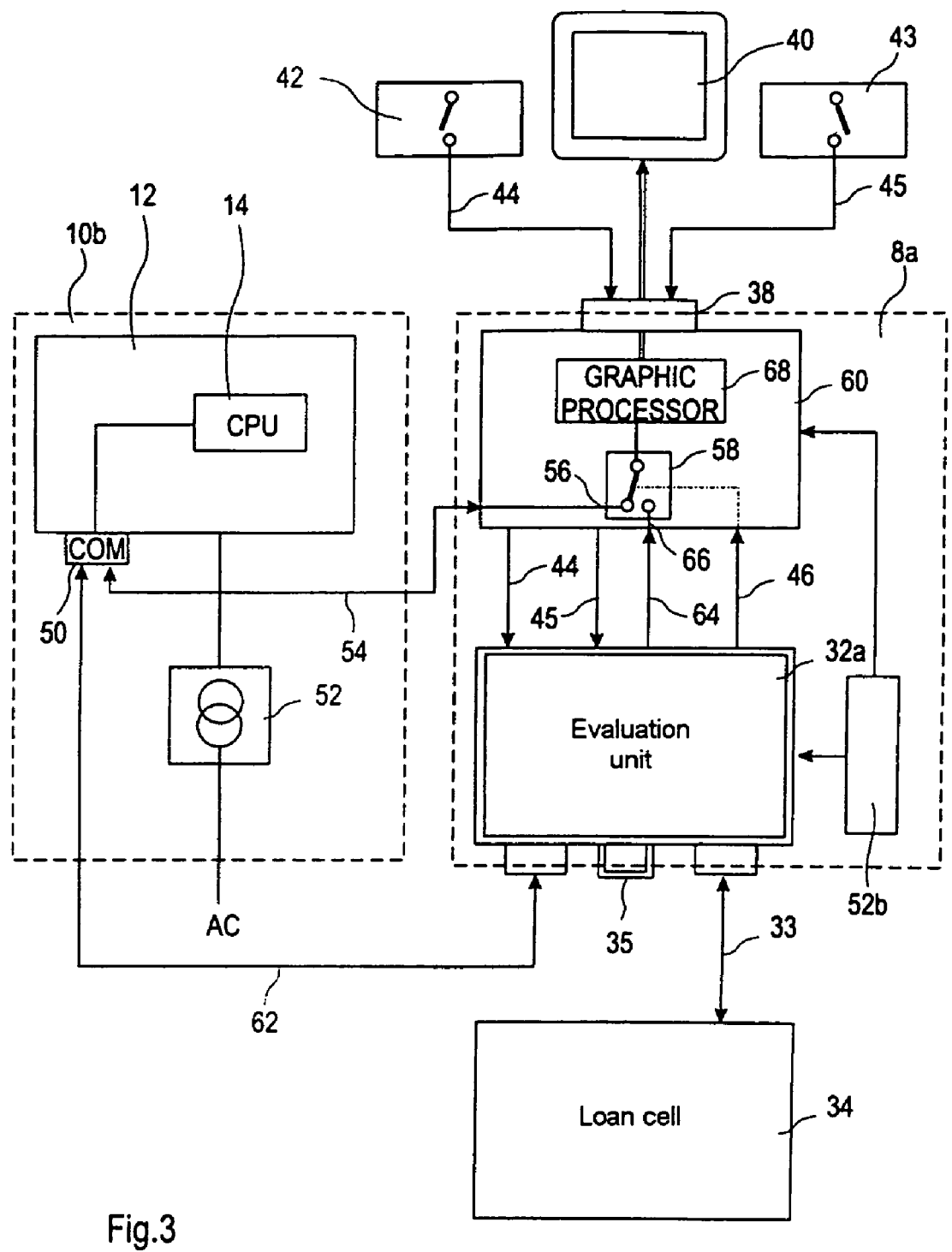
FIG. 3 shows a block diagram of a third combination of a cash register with a balance.

FIG. 3 shows a block diagram of a third exemplary embodiment of a combination of a cash register and a balance. A further electronic box 10b, constructed on the basis of the PC principle, is represented by broken lines. Arranged in it in turn on a motherboard 12 is a data processing unit 14. A second serial data connection 54 leads from the data processing unit 14 to a first input 56 of a data multiplexer 58, which is arranged on a further video module card 60. A third serial data connection 62 leads to a second evaluation unit 32a, which differs from the first evaluation unit 32 in that it provides the weighing data as ASCII characters via a serial weighing data line 64. This line is led to a second input 66 of the data multiplexer 58. The latter is controlled in the way described above by means of a multiplex switching signal 46 generated by the second evaluation unit 32a.

The output of the data multiplexer 58 is connected to a graphic processor 68, which converts the serial price and/or product data and the weighing data into video signals. These are supplied to the customer display 40 via the screen plug 38.

The second evaluation unit 32a and the further video module card 60 are arranged in a separate housing 8a. They are supplied with electrical power by a power supply unit 52b integrated therein.

The second and third serial data connections 54, 62 may also be configured on the basis of the USB standard. If a so-called power USB connection is concerned, known also to include power supply lines, the power supply unit 52b can be omitted. The separately represented serial data connections 54, 62 are to be understood as logical connections, which of course can also be routed via a single line.

The use of a serial data connection between the electronic box 10b and the separate housing 8a has the advantage that lines of any length can be used, and moreover may have a smaller number of conductors than in the case of transmission of data in video format. A multiplexer for serial data streams is also less expensive than a video multiplexer. Furthermore, a combination of a balance with a cash register according to the third exemplary embodiment is particularly well suited for retrofitting a cash register with a balance, since only software changes are required.

It is evident from the foregoing description that weighing data to be displayed are supplied directly to the customer display 40, without passing through the data processing unit 14. There is consequently also no possibility of the weighing data displayed being manipulated. Moreover, the previously used cash register software can be used unchanged.

The invention claimed is:

1. A combination balance and cash register comprising:
   a balance having a weighing cell and an evaluation unit in communication with said weighing cell;
   a cash register having a data processing unit built into an electronic box and in communication with a VDU control unit;
   a video multiplexer having a first input in communication with said VDU control unit and thereby said data processing unit for accepting signals there from indicative of price and product data, and a second input in communication with said evaluation unit for accepting signals from said evaluation unit indicative of weighing data from said weighing cell,
   said evaluation unit being configured to generate a multiplex switching signal receivable by said video multiplexer for activating said second input in response to signals received from said weighing cell indicative of a non-zero weight being detected by said weighing cell,
   a display in communication with said video multiplexer for normally displaying information indicative of signals generated by said data processing unit; and wherein
   said display, upon said video multiplexer receiving said multiplex switching signal, displays information indicative of signals received from said evaluation unit corresponding to said weighing data.

2. A combination balance and cash register as claimed in claim 1, the evaluation unit of which can be supplied with a zeroing signal and a tare signal, which respectively have the effect that the weighing data assume the value zero and which are generated by command buttons arranged on the cash register.

3. A combination balance and cash register as claimed in claim 1, wherein the weighing data are supplied from the evaluation unit to the data processing unit via a serial interface.

4. A combination balance and cash register as claimed in claim 1, with a calibrating switch, which is arranged in the evaluation unit in a sealable housing.

5. A combination balance and cash register as claimed in claim 1, the electronic box being constructed on the basis of the PC principle.

6. A combination balance and cash register as claimed in claim 1, the video multiplexer, which is combined with the VDU control unit to form a video module card.

7. A combination balance and cash register as claimed in claim 6, the video module card of which is built into the electronic box and is one of connected to the electronic box, or connected to an internal data/address bus of the data processing unit, via which at least one of the price and product data are supplied to it.

8. A combination balance and cash register as claimed in claim 1, the video multiplexer arranged in a housing separate from the electronic box and the VDU control unit of which is arranged in the electronic box, where the VDU control unit is connected to a data/address bus of the data processing unit and the VDU control unit being connected to the video multiplexer via a video line.

9. A combination balance and cash register as claimed in claim 1, the video multiplexer of which is supplied with at least one of the price and the product data and the weighing data in a character code respectively via a serial interface, and in which arrangement a graphic processor, converting the character-coded data into video data, is connected downstream of the video multiplexer.

10. A combination balance and cash register as claimed in claim 1, where one of the evaluation unit and the weighing cell is built into the electronic box.

11. A combination balance and cash register as claimed in claim 10, the evaluation unit of which is supplied with electrical power from a power supply unit of the electronic box.

12. A combination balance and cash register as claimed in claim 1, wherein at least the video multiplexer and the evaluation unit are arranged in a housing separate from the electronic box.

13. A combination balance and cash register as claimed in claim 12, wherein modules arranged in the housing are supplied with electrical power by a second power supply unit arranged in the housing.

14. A combination balance and cash register as claimed in claim 12, wherein modules arranged in the housing are supplied with electrical power by a power supply unit located in the electronic box via a power supply line which is included in a serial data connection.

* * * * *